(12) United States Patent
Nagamori et al.

(10) Patent No.: US 10,809,130 B2
(45) Date of Patent: Oct. 20, 2020

(54) INFRARED DETECTION CIRCUIT AND INFRARED SENSOR

(71) Applicant: Murata Manufacturing Co., Ltd., Nagaokakyo-shi, Kyoto-fu (JP)

(72) Inventors: Takuya Nagamori, Nagaokakyo (JP); Tomonori Otake, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 65 days.

(21) Appl. No.: 16/383,872

(22) Filed: Apr. 15, 2019

(65) Prior Publication Data

US 2019/0242754 A1 Aug. 8, 2019

Related U.S. Application Data

(63) Continuation of application No. PCT/JP2017/040134, filed on Nov. 7, 2017.

(30) Foreign Application Priority Data

Nov. 14, 2016 (JP) .................................. 2016-221853

(51) Int. Cl.
*G01J 5/02* (2006.01)
*G01J 5/34* (2006.01)
(Continued)

(52) U.S. Cl.
CPC ................ *G01J 5/0285* (2013.01); *G01J 1/02* (2013.01); *G01J 1/46* (2013.01); *G01J 5/34* (2013.01); *H04B 10/58* (2013.01)

(58) Field of Classification Search
CPC ................ G01J 5/0285; G01J 1/02; G01J 1/46
See application file for complete search history.

(56) References Cited

U.S. PATENT DOCUMENTS 4,933,559 A * 6/1990 Tamura .................... G01J 5/34
250/338.3
5,684,303 A 11/1997 Kim et al.
(Continued)

FOREIGN PATENT DOCUMENTS

CN 2785051 Y 5/2006
JP 64-47920 A 2/1989
(Continued)

OTHER PUBLICATIONS

Official Communication issued in corresponding European Patent Application No. 17870099.3, dated May 7, 2020.
(Continued)

*Primary Examiner* — Hugh Maupin
(74) *Attorney, Agent, or Firm* — Keating & Bennett, LLP (57) ABSTRACT

An infrared detection circuit includes an infrared sensor element, detects infrared rays and outputs a detection signal to an external detection circuit. The infrared detection circuit includes an impedance element connected between a ground of the infrared sensor element and a ground of the external detection circuit and including at least one of resistivity and inductivity. The impedance element blocks noise from outside. The ground of the infrared sensor element is connected to the impedance element via a ground of an internal substrate of the infrared detection circuit.

20 Claims, 8 Drawing Sheets

(51) Int. Cl.
  *G01J 1/46* (2006.01)
  *H04B 10/58* (2013.01)
  *G01J 1/02* (2006.01)

(56) References Cited

U.S. PATENT DOCUMENTS

| | | |
|---|---|---|
| 6,294,783 B1 | 9/2001 | Hayashi |
| 6,395,575 B1 | 5/2002 | Umeda et al. |
| 2002/0179842 A1 | 12/2002 | Ookawa |
| 2011/0020011 A1 | 1/2011 | Yazaki |
| 2013/0032718 A1 | 2/2013 | DiPoala |
| 2014/0042320 A1* | 2/2014 | Knaup ............... G01J 5/0285 250/338.3 |
| 2014/0284480 A1 | 9/2014 | Yonemura et al. |

FOREIGN PATENT DOCUMENTS

| | | |
|---|---|---|
| JP | 02-254395 A | 10/1990 |
| JP | 03-176621 A | 7/1991 |
| JP | 04-118637 U | 10/1992 |
| JP | 05-296830 A | 11/1993 |
| JP | 05-340807 A | 12/1993 |
| JP | 08-5552 A | 1/1996 |
| JP | 08-77467 A | 3/1996 |
| JP | 2859590 B2 | 2/1999 |
| JP | 11-83623 A | 3/1999 |
| JP | 11-108757 A | 4/1999 |
| JP | 2607440 Y2 | 9/2001 |
| JP | 2002-122472 A | 4/2002 |
| JP | 2002-122473 A | 4/2002 |
| JP | 2010-145302 A | 7/2010 |
| JP | 2011-029738 A | 2/2011 |
| JP | 2011-205210 A | 10/2011 |
| JP | 2014-185982 A | 10/2014 |
| JP | 2014-187193 A | 10/2014 |
| WO | 99/61870 A1 | 12/1999 |
| WO | 2016/163195 A1 | 10/2016 |

OTHER PUBLICATIONS

Official Communication issued in International Patent Application No. PCT/JP2017/040134, dated Jan. 30, 2018.

* cited by examiner

PACKAGE 21A OF INFRARED SENSOR 20D

FIG. 4B

PACKAGE 21E OF INFRARED SENSOR 20E

INFRARED DETECTION CIRCUIT AND INFRARED SENSOR

CROSS REFERENCE TO RELATED APPLICATIONS

This application claims the benefit of priority to Japanese Patent Application No. 2016-221853 filed on Nov. 14, 2016 and is a Continuation Application of PCT Application No. PCT/JP2017/040134 filed on Nov. 7, 2017. The entire contents of each of these applications are hereby incorporated herein by reference.

BACKGROUND OF THE INVENTION

1. Field of the Invention

The present invention relates to an infrared detection circuit and an infrared sensor each of which includes, for example, a pyroelectric element.

2. Description of the Related Art

Figure 7A:
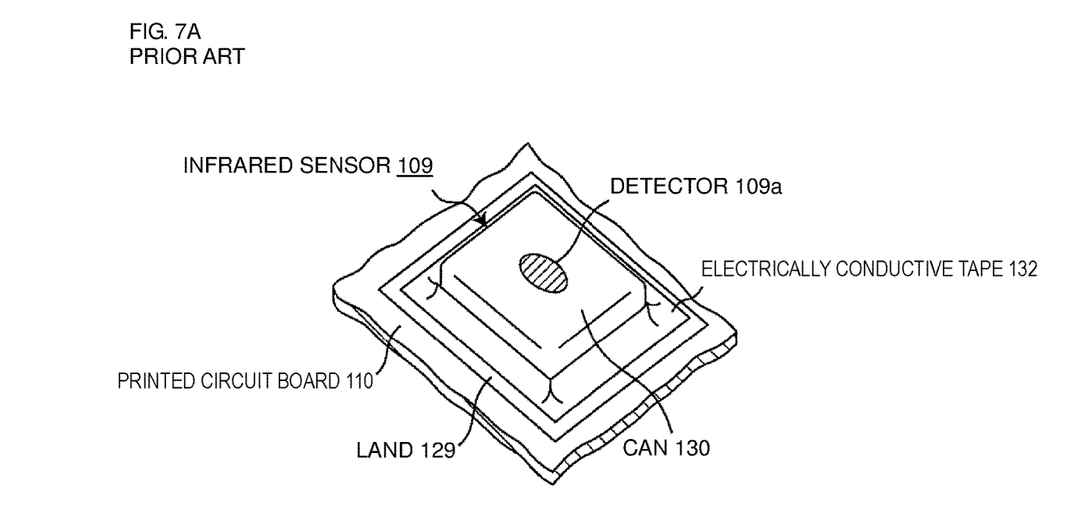
FIG. 7A is a perspective view illustrating an infrared sensor 109 of the related art.
Figure 7B:
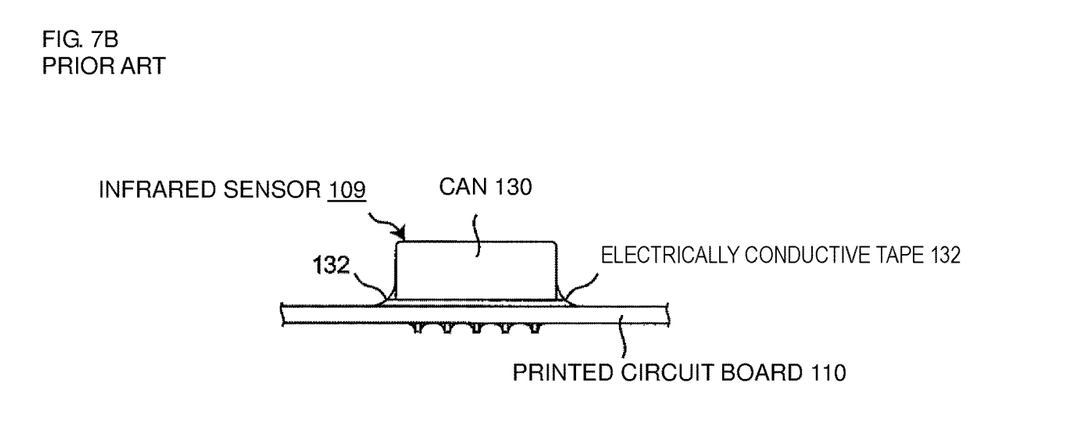
FIG. 7B is a side view of the infrared sensor 109 illustrated in FIG. 7A.

FIG. 7A is a perspective view illustrating the configuration of an infrared sensor 109 of the related art disclosed in Japanese Unexamined Patent Application Publication No. 2002-122473. FIG. 7B is a side view of the infrared sensor 109 illustrated in FIG. 7A. In the infrared sensor 109 illustrated in FIGS. 7A and 7B, an electrically conductive tape 132 is used to shield the infrared sensor 109, and FIG. 7B illustrates a printed circuit board 110 on which the infrared sensor 109 is mounted.

In FIG. 7A, a land 129 that is grounded to the ground of the printed circuit board 110 and that has a rectangular frame shape is formed on a portion of the printed circuit board 110 on which the infrared sensor 109 is mounted. A can 130 that is a metal case of the infrared sensor 109 is disposed such that a lower end portion of the can 130 is in contact with the land 129. Here, there is a slight gap between the can 130 and the land 129, and in the related art, as illustrated in FIGS. 7A and 7B, a shield structure is provided in which a contact portion at which the can 130 of the infrared sensor 109 and the land 129 of the printed circuit board 110 are in contact with each other is completely enclosed by the electrically conductive tape 132 attached to the periphery of the contact portion.

As a result of the contact portion at which the can 130 of the infrared sensor 109 and the land 129 of the printed circuit board 110, which is grounded, are in contact with each other, being completely enclosed and covered by the electrically conductive tape 132, even if there is a gap between the can 130 and the land 129, the gap is electrically closed by the electrically conductive tape 132, which is attached to the periphery of the contact portion so as to surround the contact portion, so that electrical airtightness is able to be ensured. Japanese Unexamined Patent Application Publication No. 2002-122473 discloses that, by providing the shield structure in which a gap between the can 130 and the land 129 is electrically hermetically sealed by the electrically conductive tape 132 as described above, even if radioactive noise is transmitted from the outside, the radioactive noise is able to be reliably prevented from flowing through the gap between the can 130 and the land 129 onto a pin (a lead wire) of the infrared sensor 109.

In the above-described case of the related art, the shield structure is fabricated by connecting the can 130, which is the metal case of the infrared sensor 109, to a ground GND and by using the electrically conductive tape 132, such that the influence of noise from the outside is reduced. However, a ground pin of the infrared sensor 109 and the can 130, which is a shield case, are integrated with each other, and thus, the infrared sensor 109 is not resistant to noise input from an external ground, so that there has been a problem in that a malfunction occurs in the infrared sensor 109.

SUMMARY OF THE INVENTION

Preferred embodiments of the present invention provide infrared detection circuits and infrared sensors which are each resistant to noise input from an external ground and in which a malfunction does not occur.

An infrared detection circuit according to a preferred embodiment of the present invention detects infrared rays and outputs a detection signal to an external detection circuit. An infrared detection circuit according to a preferred embodiment of the present invention includes an infrared sensor element and an impedance element that is connected between a ground of the infrared sensor element and a ground of the external detection circuit and that has at least one of resistivity and inductivity.

In the infrared detection circuit, the impedance element blocks noise from outside.

In an infrared detection circuit according to a preferred embodiment of the present invention, the ground of the infrared sensor element is connected to the impedance element via a ground of an internal substrate of the infrared detection circuit.

An infrared detection circuit according to a preferred embodiment of the present invention includes an impedance conversion circuit that performs impedance conversion on a detection signal from the infrared sensor element and outputs the detection signal.

In an infrared detection circuit according to a preferred embodiment of the present invention, the impedance conversion circuit includes a field-effect transistor, a voltage follower circuit including an operational amplifier, or an impedance conversion circuit of an integrated circuit.

An infrared detection circuit according to a preferred embodiment of the present invention includes at least one of a resistance element that is connected in parallel to the infrared sensor element, an impedance element that is connected between a power supply terminal of the impedance conversion circuit and a power supply terminal of the infrared detection circuit, and an impedance element that is connected between a signal output terminal of the impedance conversion circuit and a signal processing circuit of the external detection circuit.

An infrared detection circuit according to a preferred embodiment of the present invention includes at least one of a bypass capacitor that is connected between the power supply terminal of the infrared detection circuit and the ground of the infrared sensor element or the ground of the external detection circuit and a bypass capacitor that is connected between the signal output terminal of the infrared detection circuit and the ground of the infrared sensor element or the ground of the external detection circuit.

An infrared sensor according to a preferred embodiment of the present invention detects infrared rays and outputs a detection signal to an external detection circuit. An infrared sensor according to a preferred embodiment of the present invention includes an infrared sensor element and an impedance element that is connected between a ground of the infrared sensor element and a ground of the external detection circuit and that has at least one of resistivity and inductivity.

In the infrared sensor, the impedance element blocks noise from outside.

In an infrared sensor according to a preferred embodiment of the present invention, the impedance element is disposed in a package of the infrared sensor.

In an infrared sensor according to a preferred embodiment of the present invention, the impedance element is disposed outside a package of the infrared sensor.

In an infrared sensor according to a preferred embodiment of the present invention, the ground of the infrared sensor element is connected to the impedance element via a ground of an internal substrate of the infrared sensor.

An infrared sensor according to a preferred embodiment of the present invention includes an impedance conversion circuit that performs impedance conversion on a detection signal from the infrared sensor element and outputs the detection signal.

In an infrared sensor according to a preferred embodiment of the present invention, the impedance conversion circuit includes a field-effect transistor, a voltage follower circuit using an operational amplifier, or an impedance conversion circuit of an integrated circuit.

An infrared sensor according to a preferred embodiment of the present invention includes at least one of a resistance element that is connected in parallel to the infrared sensor element, an impedance element that is connected between a power supply terminal of the impedance conversion circuit and a power supply terminal of the infrared sensor, and an impedance element that is connected between a signal output terminal of the impedance conversion circuit and a signal processing circuit of the external detection circuit.

An infrared sensor according to a preferred embodiment of the present invention includes at least one of a bypass capacitor that is connected between the power supply terminal of the infrared sensor and the ground of the infrared sensor element or the ground of the external detection circuit and a bypass capacitor that is connected between the signal output terminal of the infrared sensor and the ground of the infrared sensor element or the ground of the external detection circuit.

In infrared detection circuits and infrared sensors according to preferred embodiments of the present invention, noise input from an external ground does not flow to the ground of the infrared detection circuits or the ground of the infrared sensors, and thus, a malfunction of the infrared sensors is able to be prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings. Note that, in the following preferred embodiments, the same or similar components are denoted by the same reference signs.

First Preferred Embodiment

Figure 1:
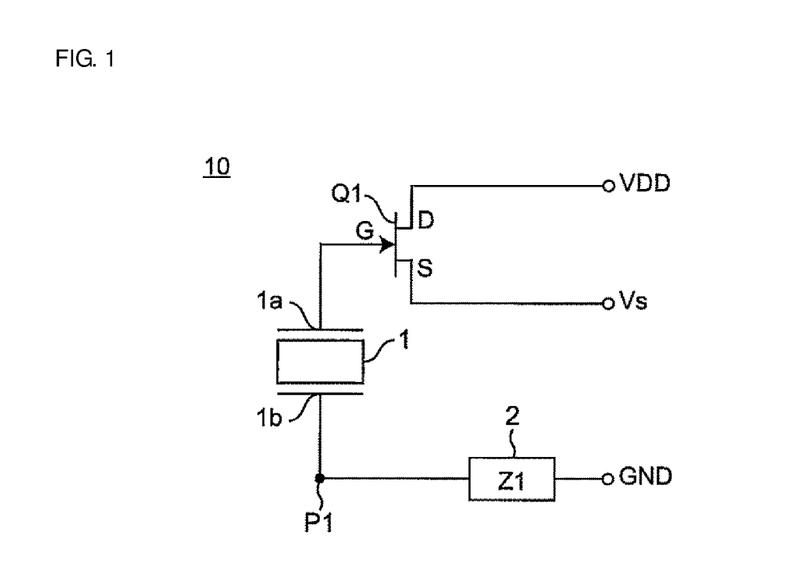
FIG. 1 is a circuit diagram illustrating an example of an infrared detection circuit 10 according to a first preferred embodiment of the present invention.

FIG. 1 is a circuit diagram illustrating a configuration of an infrared detection circuit 10 according to a first preferred embodiment of the present invention. In FIG. 1, the infrared detection circuit 10 includes a pyroelectric element 1 defining an infrared sensor element, an impedance element 2 defined by a passive element including at least one of a resistive impedance Z1 and an inductive impedance Z1, and a field-effect transistor (hereinafter referred to as FET) Q1 included in an impedance conversion circuit. In particular, a feature of the infrared detection circuit 10 according to the first preferred embodiment is that the infrared detection circuit 10 includes the impedance element 2.

In FIG. 1, the pyroelectric element 1 includes a signal output terminal 1a and a ground terminal 1b. The signal output terminal 1a is connected to the gate of the FET Q1, and a power supply voltage VDD is applied to the drain (a power supply terminal) of the FET Q1 from a power supply terminal of the infrared detection circuit 10. The source of the FET Q1 is a signal output terminal for a detection signal and is connected to an external detection circuit of an external substrate (not illustrated). In contrast, the ground terminal 1b is connected to a ground GND of the external substrate via a connection point P1 of an internal substrate of the infrared detection circuit 10 and the impedance element 2. The pyroelectric element 1 and the FET Q1 are provided, for example, on the internal substrate of the infrared detection circuit 10. The FET Q1 performs impedance conversion from a predetermined first impedance to a predetermined second impedance that is lower than the first impedance. An infrared detection signal that is output by the pyroelectric element 1 is output as an infrared detection voltage signal Vs to the external detection circuit via the FET Q1, which performs impedance conversion.

Here, the impedance element 2 has any one of the following impedances Z1 and defines and functions as a filter element that blocks a specified noise that is radiated from the outside or that enters from the outside.

$$Z1=R1 \quad (1)$$

$$Z1=j\omega L1 \quad (2)$$

$$Z1=R1+j\omega L1 \quad (3)$$

Here, the symbol "ω" refers to angular frequency. Accordingly, as is clear from the formula (1) to the formula (3), the impedance element 2 is defined by only a resistance element, only an inductance element, or a series circuit including a resistance element and an inductance element.

In the case in which the impedance element 2 is defined by only a resistance element, a resistance R1 is set such that the noise from the outside is able to be prevented, by a resistive loss of the resistance element, from being input to the ground terminal 1b of the pyroelectric element 1 from the ground GND of the external substrate.

In the case in which the impedance element 2 is defined by only an inductance element, an inductance L1 is set such that the noise from the outside is able to be prevented, by an inductive loss of the inductance element, from being input to the ground terminal 1b of the pyroelectric element 1 from the ground GND of the external substrate.

In the case in which the impedance element 2 is defined by a series circuit including a resistance element and an inductance element, the resistance R1 and the inductance L1 are set such that the noise from the outside is able to be prevented, by the resistive loss of the resistance element and the inductive loss of the inductance element, from being input to the ground terminal 1b of the pyroelectric element 1 from the ground GND of the external substrate.

Here, the noise from the outside is, for example, noise having a frequency of about several tens of MHz to about several GHz, particularly, for example, a Wi-Fi signal that is used in a wireless LAN, a radio signal that is used in a cellular phone system, or other noise. The impedance element 2 is not a parasitic element and is a passive element in order to prevent the noise from being input to the pyroelectric element 1.

In the infrared detection circuit 10, which is configured as described above, the impedance element 2 is inserted between the connection point P1 of the internal substrate, which is connected to the ground terminal 1b of the pyroelectric element 1, and a ground terminal of the external detection circuit, so that a radiation noise radiated to the infrared detection circuit 10 from the outside does not propagate to the ground terminal 1b of the pyroelectric element 1 or to the connection point P1, which is connected to the ground terminal 1b. Therefore, a malfunction of the pyroelectric element 1 in the infrared detection circuit 10 is able to be prevented.

In the present preferred embodiment, although the impedance element 2 is connected between the connection point P1 of the internal substrate and the ground of the external substrate, the present invention is not limited to this configuration, and the ground terminal 1b of the pyroelectric element 1 may be directly connected to the ground of the external substrate via the impedance element 2. In other words, an end of the impedance element 2 is directly or indirectly connected to the ground terminal 1b of the pyroelectric element 1. This is preferably common to the following preferred embodiments and modifications, for example.

Second Preferred Embodiment

Figure 2A:
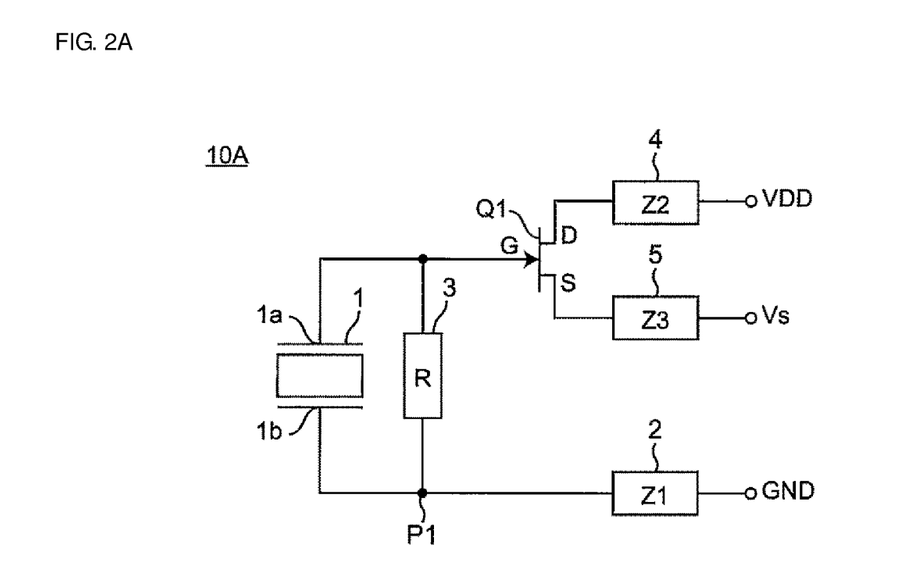
FIG. 2A is a circuit diagram illustrating an example of an infrared detection circuit 10A according to a second preferred embodiment of the present invention.

FIG. 2A is a circuit diagram illustrating a configuration of an infrared detection circuit 10A according to a second preferred embodiment of the present invention. As illustrated in FIG. 2A, unlike the infrared detection circuit 10 according to the first preferred embodiment, which is illustrated in FIG. 1, the infrared detection circuit 10A according to the second preferred embodiment further includes the following elements.

A resistance element 3 that has a resistance R is connected to the two ends of the pyroelectric element 1 in parallel to the pyroelectric element 1.

An impedance element 4 defined by a passive element including at least one of a resistive impedance Z2 and an inductive impedance Z2 is connected between the drain of the FET Q1 and the power supply terminal for the power supply voltage VDD (the power supply terminal of the infrared detection circuit 10A).

An impedance element 5 defined by a passive element including at least one of a resistive impedance Z3 and an inductive impedance Z3 is connected between the source of the FET Q1 and a signal output terminal that outputs the infrared detection voltage signal Vs.

Similar to the infrared detection circuit 10 illustrated in FIG. 1, the infrared detection circuit 10A, which is configured as described above, includes the impedance element 2, and thus, a radiation noise radiated to the infrared detection circuit 10A from the outside does not flow to the ground terminal 1b of the pyroelectric element 1 or to the connection point P1, which is connected to the ground terminal 1b. Therefore, a malfunction of the pyroelectric element 1 in the infrared detection circuit 10A is able to be prevented.

Note that, although the resistance element 3 and the impedance elements 4 and 5 are provided in the second preferred embodiment, the present invention is not limited to this configuration, and at least one of the elements 3, 4, and 5 may be provided. This is preferably common to the preferred embodiments and modifications, for example, which will be described below.

First Modification of Second Preferred Embodiment

Figure 2B:
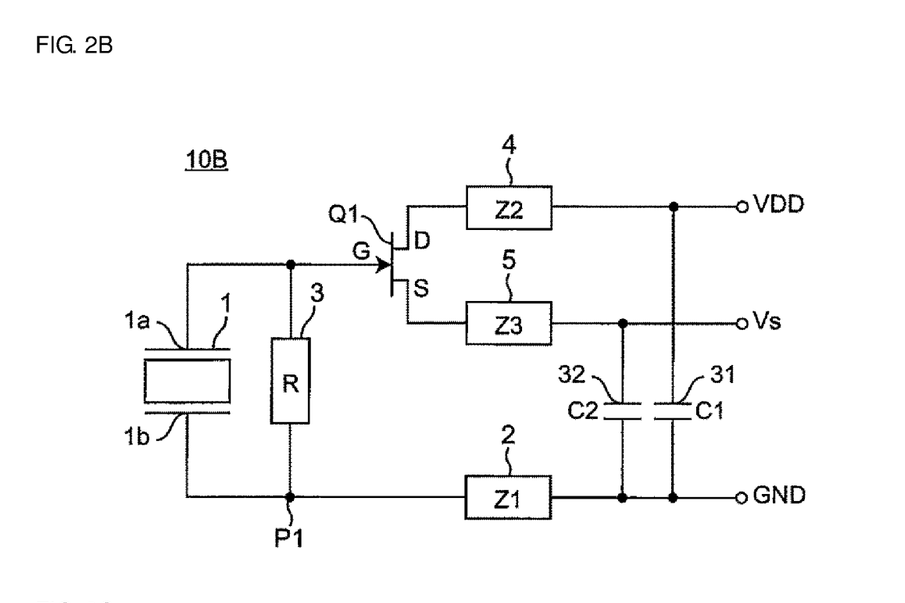
FIG. 2B is a circuit diagram illustrating an example of an infrared detection circuit 10B according to a first modification of the second preferred embodiment of the present invention.

FIG. 2B is a circuit diagram illustrating a configuration of an infrared detection circuit 10B according to a first modification of the second preferred embodiment. As illustrated in FIG. 2B, unlike the infrared detection circuit 10A according to the second preferred embodiment, which is illustrated in FIG. 2A, the infrared detection circuit 10B according to the first modification of the second preferred embodiment further includes the following elements.

A bypass capacitor 31 including a capacitance C1 to cause the radiation noise to bypass and flow to the ground GND is connected between the power supply terminal for the power supply voltage VDD and the ground GND.

A bypass capacitor 32 including a capacitance C2 to cause the radiation noise to bypass and flow to the ground GND is connected between the signal output terminal, which outputs the infrared detection voltage signal Vs, and the ground GND.

According to the infrared detection circuit 10B, which is configured as described above, in addition to the advantageous effects of the infrared detection circuit 10A, the radiation noise is caused to bypass and flow to the ground GND by the bypass capacitors 31 and 32, and a malfunction of the pyroelectric element 1 in the infrared detection circuit 10B is able to be prevented.

Note that a configuration in which at least one of the bypass capacitors 31 and 32 is provided may be used. This is common to the preferred embodiments and modifications, which will be described below.

Second Modification of Second Preferred Embodiment

Figure 2C:
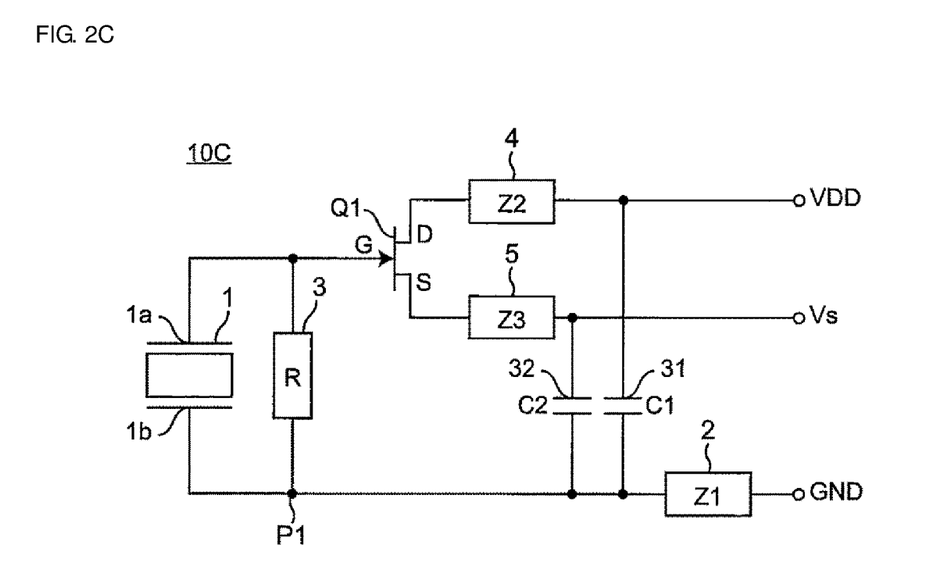
FIG. 2C is a circuit diagram illustrating an example of an infrared detection circuit 10C according to a second modification of the second preferred embodiment of the present invention.

FIG. 2C is a circuit diagram illustrating a configuration of an infrared detection circuit 10C according to a second modification of the second preferred embodiment. As illustrated in FIG. 2C, unlike the infrared detection circuit 10A according to the second preferred embodiment, which is illustrated in FIG. 2A, the infrared detection circuit 10B according to the second modification of the second preferred embodiment further includes the following elements.

The bypass capacitor 31 including the capacitance C1 to cause the radiation noise to bypass and flow to the ground GND is connected between the power supply terminal for the power supply voltage VDD and the connection point P1.

The bypass capacitor 32 including the capacitance C2 to cause the radiation noise to bypass and flow to the ground GND is connected between the signal output terminal, which outputs the infrared detection voltage signal Vs, and the connection point P1.

According to the infrared detection circuit 10C, which is configured as described above, in addition to the advantageous effects of the infrared detection circuit 10A, the radiation noise is caused to bypass and flow to the ground GND via the impedance element 2 by the bypass capacitors 31 and 32, and a malfunction of the pyroelectric element 1 in the infrared detection circuit 10 is able to be prevented.

Third Preferred Embodiment

Figure 3A:
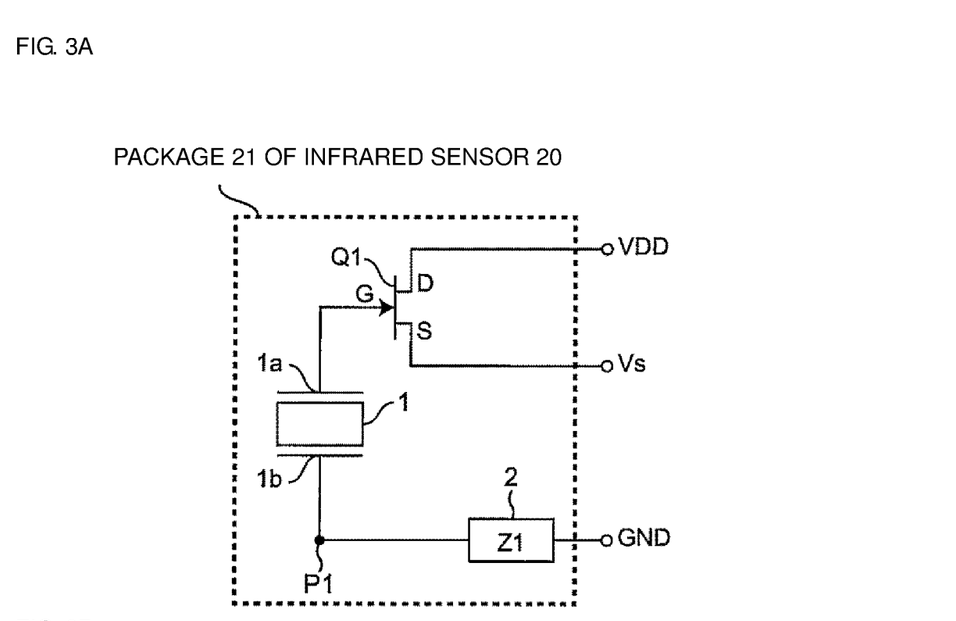
FIG. 3A is a circuit diagram illustrating an example of an infrared sensor 20 according to a third preferred embodiment of the present invention.

FIG. 3A is a circuit diagram illustrating a configuration of an infrared sensor 20 according to a third preferred embodiment of the present invention. As illustrated in FIG. 3A, unlike the infrared detection circuit 10 according to the first preferred embodiment, which is illustrated in FIG. 1, a package 21 of the infrared sensor 20 according to the third preferred embodiment accommodates the pyroelectric element 1, the FET Q1, and the impedance element 2 therein.

Similar to the infrared detection circuit 10 illustrated in FIG. 1, the package 21 of the infrared sensor 20, which is configured as described above, includes the impedance element 2, and thus, a radiation noise radiated to the infrared sensor 20 from the outside does not flow to the ground terminal 1b of the pyroelectric element 1 or to the connection point P1, which is connected to the ground terminal 1b. Therefore, a malfunction of the pyroelectric element 1 in the infrared sensor 20 is able to be prevented.

In the third preferred embodiment, since the pyroelectric element 1 is disposed in the package 21, a relatively strong shielding effect for the pyroelectric element 1 is provided, and as illustrated in FIG. 3A, by preventing the influence of a noise within the infrared sensor 20, which includes the pyroelectric element 1, stronger and more stable advantageous effects are able to achieved.

First Modification of Third Preferred Embodiment

Figure 3B:
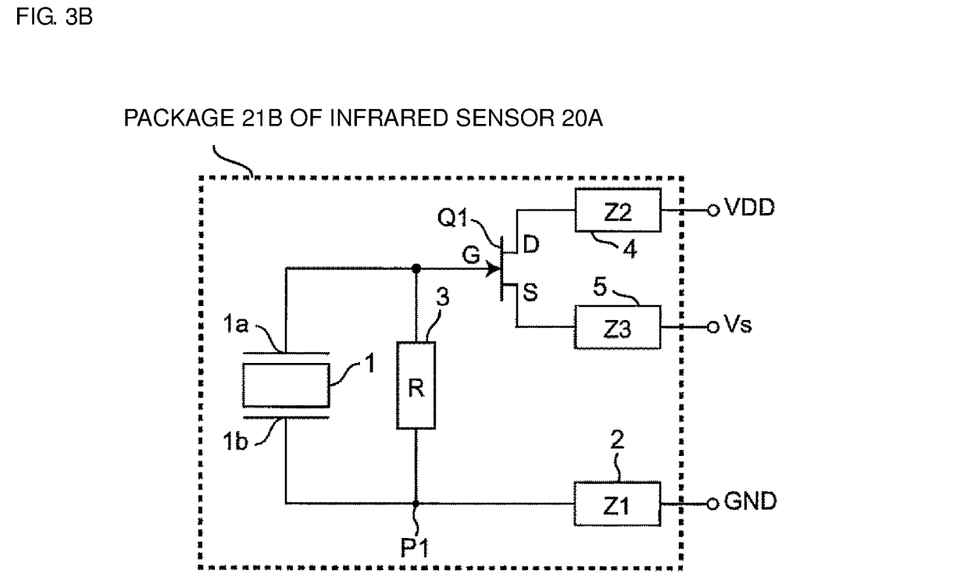
FIG. 3B is a circuit diagram illustrating an example of an infrared sensor 20A according to a first modification of the third preferred embodiment of the present invention.

FIG. 3B is a circuit diagram illustrating a configuration of an infrared sensor 20A according to a first modification of the third preferred embodiment. Unlike the infrared sensor 20 according to the third preferred embodiment, which is illustrated in FIG. 3A, and similar to the infrared detection circuit 10A according to the second preferred embodiment, which is illustrated in FIG. 2A, the infrared sensor 20A according to the first modification of the third preferred embodiment further includes the resistance element 3 and the impedance elements 4 and disposed in a package 21B of the infrared sensor 20A as illustrated in FIG. 3B. The infrared sensor 20A, which is configured as described above, achieves advantageous effects similar to those of the infrared detection circuit 10A according to the second preferred embodiment, which is illustrated in FIG. 2A.

Second Modification of Third Preferred Embodiment

Figure 3C:
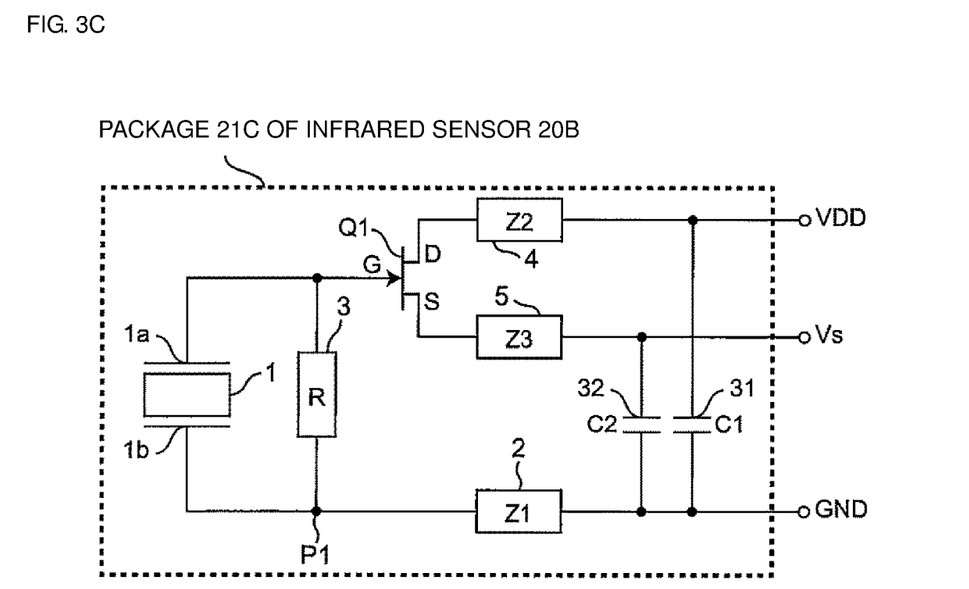
FIG. 3C is a circuit diagram illustrating an example of an infrared sensor 20B according to a second modification of the third preferred embodiment of the present invention.

FIG. 3C is a circuit diagram illustrating a configuration of an infrared sensor 20B according to a second modification of the third preferred embodiment. Unlike the infrared sensor 20A according to the first modification of the third preferred embodiment, which is illustrated in FIG. 3B, and similar to the infrared detection circuit 10B according to the first modification of the second preferred embodiment, which is illustrated in FIG. 2B, the infrared sensor 20B according to the second modification of the third preferred embodiment further includes the bypass capacitors 31 and 32 disposed in a package 21C of the infrared sensor 20A as illustrated in FIG. 3C. The infrared sensor 20B, which is configured as described above, achieves advantageous effects similar to those of the infrared detection circuit 10B according to the first modification of the second preferred embodiment, which is illustrated in FIG. 2B.

Third Modification of Third Preferred Embodiment

Figure 3D:
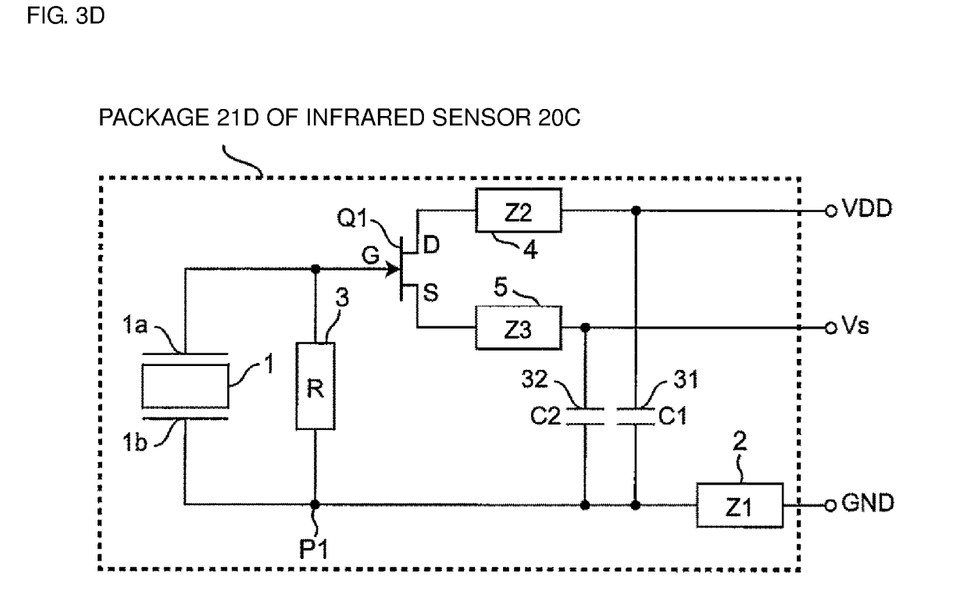
FIG. 3D is a circuit diagram illustrating an example of an infrared sensor 20C according to a third modification of the third preferred embodiment of the present invention.

FIG. 3D is a circuit diagram illustrating a configuration of an infrared sensor 20C according to a third modification of the third preferred embodiment. Compared with the infrared sensor 20B according to the second modification of the third preferred embodiment, which is illustrated in FIG. 3C, and similar to the infrared detection circuit 10C according to the second modification of the second preferred embodiment, which is illustrated in FIG. 2C, the infrared sensor 20C according to the third modification of the third preferred embodiment further includes the bypass capacitors 31 and 32 disposed in the package 21D of the infrared sensor 20C as illustrated in FIG. 3D. The infrared sensor 20C, which is configured as described above, has advantageous effects similar to those of the infrared detection circuit 10C according to the second modification of the second preferred embodiment, which is illustrated in FIG. 2C.

Fourth Preferred Embodiment

Figure 4A:
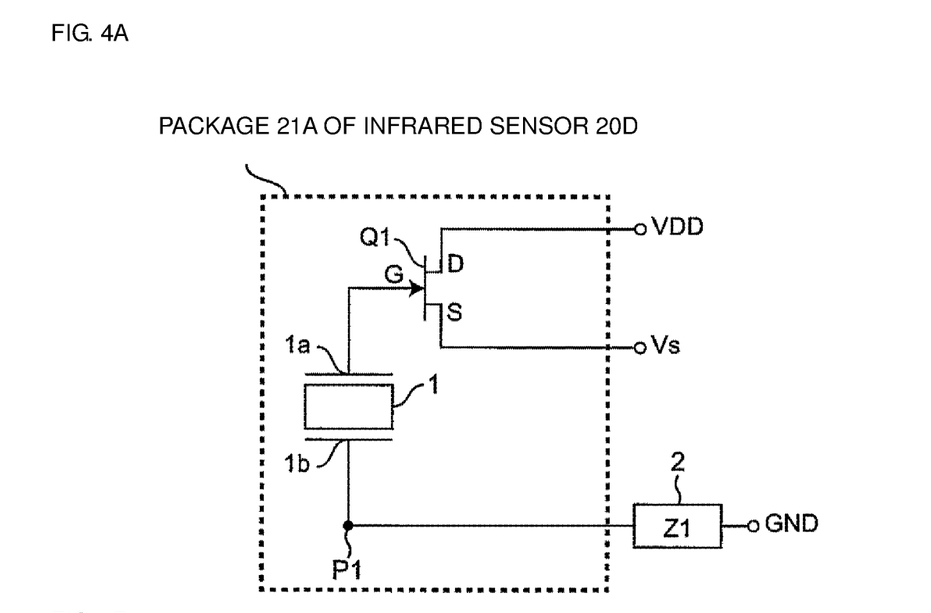
FIG. 4A is a circuit diagram illustrating an example of an infrared sensor 20D according to a fourth preferred embodiment of the present invention.

FIG. 4A is a circuit diagram illustrating a configuration of an infrared sensor 20D according to a fourth preferred embodiment of the present invention. As illustrated in FIG. 4A, unlike the infrared detection circuit 10 according to the first preferred embodiment, which is illustrated in FIG. 1, a package 21A of the infrared sensor 20D according the fourth preferred embodiment accommodates the pyroelectric element 1 and the FET Q1 therein, and the impedance element 2 is not accommodated in the package 21A and is connected between the package 21A of the infrared sensor 20D and an external detection circuit.

Similar to the infrared detection circuit 10 illustrated in FIG. 1, the package 21A of the infrared sensor 20D, which is configured as described above, includes the impedance element 2, and thus, a radiation noise radiated to the infrared detection circuit 10 from the outside does not flow to the ground terminal 1b of the pyroelectric element 1 or to the connection point P1, which is connected to the ground terminal 1b. Therefore, a malfunction of the pyroelectric element 1 in the infrared sensor 20D is able to be prevented.

Similar to the third preferred embodiment, in the fourth preferred embodiment, since the pyroelectric element 1 is disposed in the package 21A, a relatively strong shielding effect for the pyroelectric element 1 is provided, and as illustrated in FIG. 4A, by preventing the influence of noise outside the infrared sensor 20D, which includes the pyroelectric element 1, stronger and more stable advantageous effects are able to be achieved.

First Modification of Fourth Preferred Embodiment

Figure 4B:
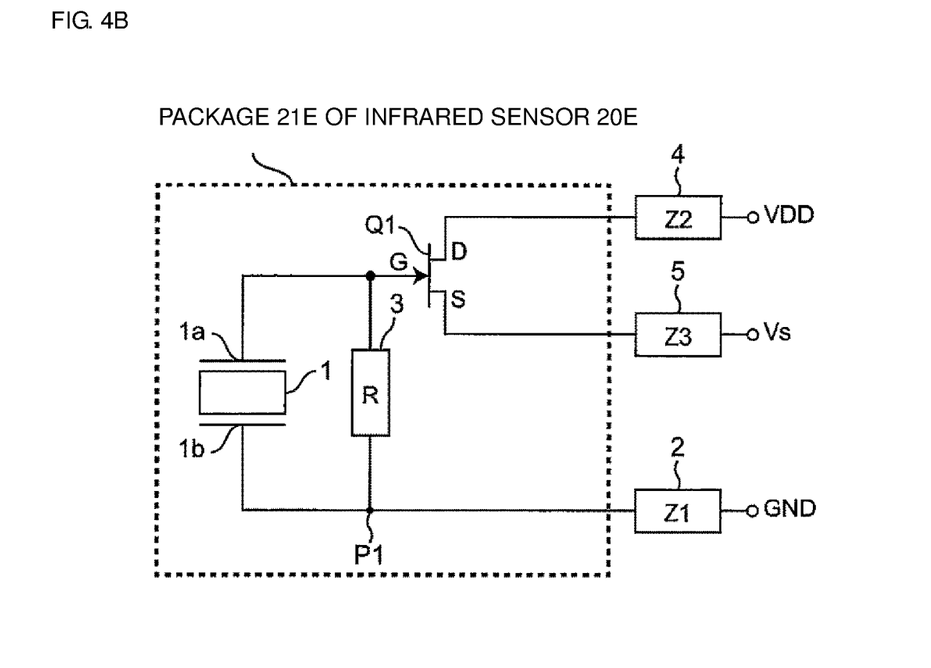
FIG. 4B is a circuit diagram illustrating an example of an infrared sensor 20E according to a first modification of the fourth preferred embodiment and an example of an external circuit according to the first modification of the fourth preferred embodiment of the present invention.

FIG. 4B is a circuit diagram illustrating a configuration of an infrared sensor 20E according to a first modification of the fourth preferred embodiment and a configuration of an external circuit according to the first modification of the fourth preferred embodiment. Unlike the infrared sensor 20D and the external circuit according to the third preferred embodiment, which are illustrated in FIG. 4A, and similar to the infrared detection circuit 10A according to the second preferred embodiment, which is illustrated in FIG. 2A, the infrared sensor 20E according to the first modification of the fourth preferred embodiment includes the resistance element 3 disposed in a package 21E of the infrared sensor 20E, and the impedance elements 4 and 5 are included in the external circuit according to the first modification of the fourth preferred embodiment, which is located outside the package 21E of the infrared sensor 20E, as illustrated in FIG. 4B. The infrared sensor 20E and the external circuit, which are configured as described above, have advantageous effects similar to those of the infrared detection circuit 10A according to the second preferred embodiment, which is illustrated in FIG. 2A.

Second Modification of Fourth Preferred Embodiment

Figure 4C:
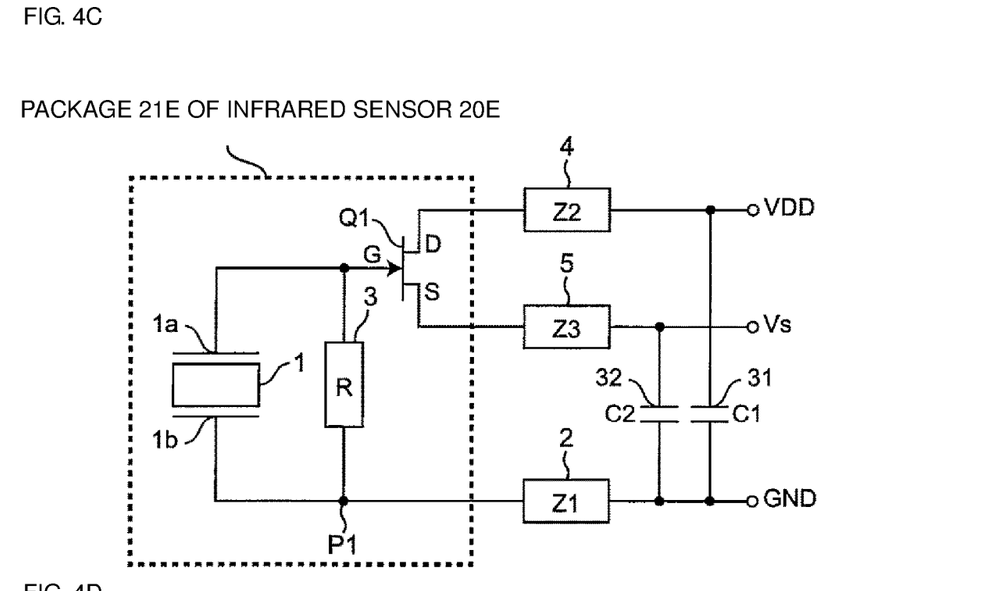
FIG. 4C is a circuit diagram illustrating an example of the infrared sensor 20E according to a second modification of the fourth preferred embodiment and an example of an external circuit according to the second modification of the fourth preferred embodiment of the present invention.

FIG. 4C is a circuit diagram illustrating a configuration of the infrared sensor 20E according to a second modification of the fourth preferred embodiment and a configuration of an external circuit according to the second modification of the fourth preferred embodiment. Regarding the infrared sensor 20E and the external circuit according to the second modification of the fourth preferred embodiment, unlike the infrared sensor 20E and the external circuit according to the first modification of the fourth preferred embodiment, which are illustrated in FIG. 4B, and similar to the infrared detection circuit 10B according to the first modification of the second preferred embodiment, which is illustrated in FIG. 2B, the bypass capacitors 31 and 32 are further included in the external circuit outside the package 21E of the infrared sensor 20E as illustrated in FIG. 4C. The infrared sensor 20E and the external circuit, which are configured as described above, have advantageous effects similar to those of the infrared detection circuit 10B according to the first modification of the second preferred embodiment, which is illustrated in FIG. 2B.

Third Modification of Fourth Preferred Embodiment

Figure 4D:
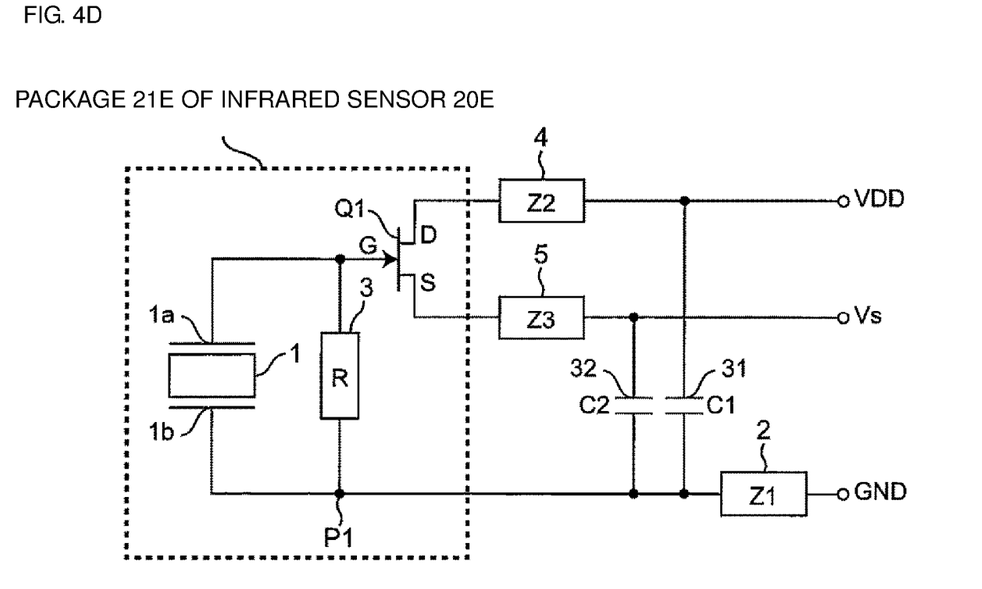
FIG. 4D is a circuit diagram illustrating an example of the infrared sensor 20E according to a third modification of the fourth preferred embodiment and an example of an external circuit according to the third modification of the fourth preferred embodiment of the present invention.

FIG. 4D is a circuit diagram illustrating a configuration of the infrared sensor 20E according to a third modification of the fourth preferred embodiment and a configuration of an external circuit according to the third modification of the fourth preferred embodiment. Regarding the infrared sensor 20E and the external circuit according to the third modification of the fourth preferred embodiment, compared with the infrared sensor 20E and the external circuit according to the second modification of the fourth preferred embodiment, which are illustrated in FIG. 4C, and similar to the infrared detection circuit 10C according to the second modification of the second preferred embodiment, which is illustrated in FIG. 2C, the bypass capacitors 31 and 32 are further included in the external circuit outside the package 21E of the infrared sensor 20E as illustrated in FIG. 4D. The infrared sensor 20E and the external circuit, which are configured as described above, achieve advantageous effects similar to those of the infrared detection circuit 10B according to the second modification of the second preferred embodiment, which is illustrated in FIG. 2C.

Modification 1

Figure 5:
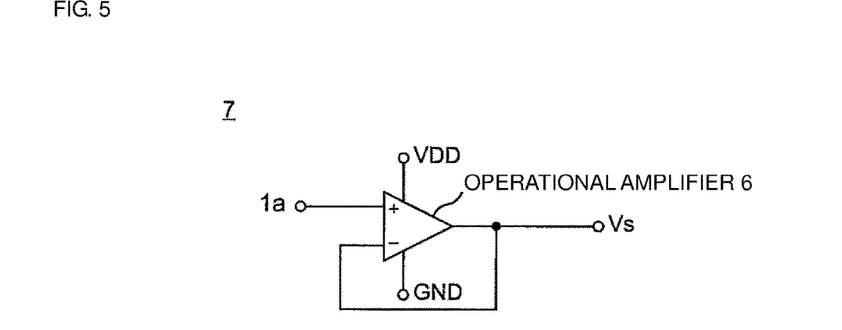
FIG. 5 is a circuit diagram illustrating an example of an impedance conversion circuit 7 according to a Modification 1 of a preferred embodiment of the present invention.

FIG. 5 is a circuit diagram illustrating a configuration of an impedance conversion circuit 7 according to a Modification 1 of a preferred embodiment of the present invention. In the first to fourth preferred embodiments and their modifications, the FET Q1 is provided as an impedance conversion circuit. However, the present invention is not limited to this configuration, and as in the Modification 1 illustrated in FIG. 5, a voltage follower circuit including an operational amplifier 6 may be provided as the impedance conversion circuit 7. In FIG. 5, the operational amplifier 6 is preferably, for example, a differential amplifier. A non-inverting input terminal of the operational amplifier 6 is connected to the signal output terminal 1a of the pyroelectric element 1, and an inverting input terminal of the operational amplifier 6 is connected to an output terminal of the operational amplifier 6. The power supply terminal for the power supply voltage VDD (the power supply terminal of one of the infrared detection circuits 10 and 10A or the power supply terminal of one of the infrared sensors 20 to 20E) and the ground GND are connected to the operational amplifier 6.

Similar to the FET Q1, the impedance conversion circuit 7 according to the Modification 1, which is configured as described above, performs impedance conversion from a predetermined first impedance to a predetermined second impedance that is lower than the first impedance.

Modification 2

Figure 6:
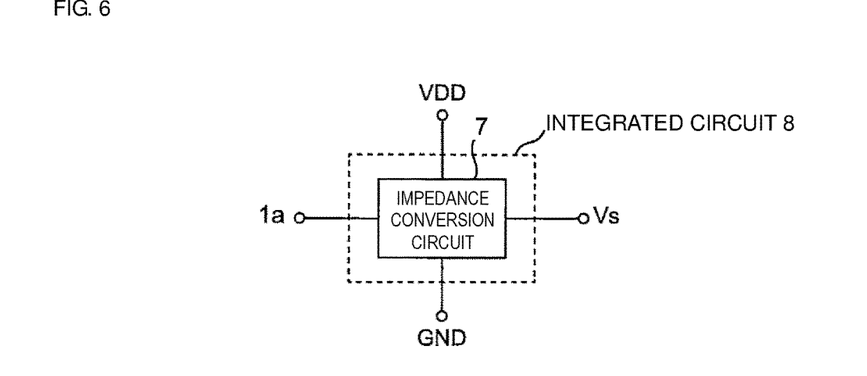
FIG. 6 is a circuit diagram illustrating an example of an integrated circuit 8 according to a Modification 2 of a preferred embodiment of the present invention that includes the impedance conversion circuit 7.

FIG. 6 is a circuit diagram illustrating a configuration example of an integrated circuit 8 according to a Modification 2 of a preferred embodiment of the present invention that includes the impedance conversion circuit 7. As illustrated in FIG. 6, for example, the impedance conversion circuit 7 illustrated in FIG. 5 may be defined by the integrated circuit 8. Note that the impedance conversion circuit 7 may be the FET Q1 illustrated in FIG. 1 to FIG. 4D.

As described in detail above, in the infrared detection circuit and the infrared sensor according to the present invention, noise applied from the outside does not flow to the ground of the infrared detection circuit or the ground of the infrared sensor, and thus, a malfunction is able to be prevented.

Note that an example of noise that is prevented from entering by the impedance element 2 according to the present preferred embodiment is noise having a frequency of about several tens of MHz to about several GHz, particularly, for example, a Wi-Fi signal that is used in a wireless LAN, a radio signal that is used in a cellular phone system, or other noise.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An infrared detection circuit that detects infrared rays and outputs a detection signal to an external detection circuit, the infrared detection circuit comprising:
   an infrared sensor element; and
   an impedance element connected between a ground of the infrared sensor element and a ground of the external detection circuit and including at least one of resistivity and inductivity.

2. The infrared detection circuit according to claim 1, wherein the impedance element blocks noise from outside.

3. The infrared detection circuit according to claim 2, wherein the noise from the outside has a frequency of about several tens of MHz to about several GHz.

4. The infrared detection circuit according to claim 1, wherein the ground of the infrared sensor element is connected to the impedance element via a ground of an internal substrate of the infrared detection circuit.

5. The infrared detection circuit according to claim 1, further comprising an impedance conversion circuit that performs impedance conversion on a detection signal from the infrared sensor element and outputs the detection signal.

6. The infrared detection circuit according to claim 5, wherein the impedance conversion circuit includes a field-effect transistor, a voltage follower circuit including an operational amplifier, or an impedance conversion circuit of an integrated circuit.

7. The infrared detection circuit according to claim 5, further comprising at least one of:
   a resistance element connected in parallel to the infrared sensor element;
   an impedance element connected between a power supply terminal of the impedance conversion circuit and a power supply terminal of the infrared detection circuit; and
   an impedance element connected between a signal output terminal of the impedance conversion circuit and a signal processing circuit of the external detection circuit.

8. The infrared detection circuit according to claim 7, further comprising at least one of:
   a bypass capacitor connected between the power supply terminal of the infrared detection circuit and the ground of the infrared sensor element or the ground of the external detection circuit; and
   a bypass capacitor connected between the signal output terminal of the infrared detection circuit and the ground of the infrared sensor element or the ground of the external detection circuit.

9. The infrared detection circuit according to claim 1, wherein the impedance element includes a passive element.

10. An infrared sensor that detects infrared rays and outputs a detection signal to an external detection circuit, the infrared sensor comprising:
    an infrared sensor element; and
    an impedance element connected between a ground of the infrared sensor element and a ground of the external detection circuit and including at least one of resistivity and inductivity.

11. The infrared sensor according to claim 10, wherein the impedance element blocks noise from outside.

12. The infrared sensor according to claim 11, wherein the noise from the outside has a frequency of about several tens of MHz to about several GHz.

13. The infrared sensor according to claim 10, wherein the impedance element is disposed in a package of the infrared sensor.

14. The infrared sensor according to claim 10, wherein the impedance element is disposed outside a package of the infrared sensor.

15. The infrared sensor according to claim 10, wherein the ground of the infrared sensor element is connected to the impedance element via a ground of an internal substrate of the infrared sensor.

16. The infrared sensor according to claim 10, further comprising an impedance conversion circuit that performs impedance conversion on a detection signal from the infrared sensor element and outputs the detection signal.

17. The infrared sensor according to claim 16, wherein the impedance conversion circuit includes a field-effect transistor, a voltage follower circuit including an operational amplifier, or an impedance conversion circuit of an integrated circuit.

18. The infrared sensor according to claim 16, further comprising at least one of:
    a resistance element connected in parallel to the infrared sensor element;
    an impedance element connected between a power supply terminal of the impedance conversion circuit and a power supply terminal of the infrared sensor; and
    an impedance element connected between a signal output terminal of the impedance conversion circuit and a signal processing circuit of the external detection circuit.

19. The infrared sensor according to claim 18, further comprising at least one of:
    a bypass capacitor connected between the power supply terminal of the infrared sensor and the ground of the infrared sensor element or the ground of the external detection circuit; and
    a bypass capacitor connected between the signal output terminal of the infrared sensor and the ground of the infrared sensor element or the ground of the external detection circuit.

20. The infrared sensor according to claim 10, wherein the impedance element includes a passive element.

* * * * *